Aug. 22, 1972 R. C. FRICK ET AL 3,686,054
PROCESS FOR PRODUCING MOLDED LAMINATED ARTICLES
Original Filed Aug. 10, 1962

INVENTOR/S
Roy C. Frick and Victor E. Calvin,
John C. Sharpe and William W. Rowe
BY *Melville, Strasser, Foster and Hoffman*
ATTORNEYS

3,686,054
PROCESS FOR PRODUCING MOLDED LAMINATED ARTICLES
Roy C. Frick, Victor E. Calvin, John C. Sharpe, and William Wallace Rowe, Lockland, Cincinnati, Ohio, assignors to Cincinnati Industries Inc., Cincinnati, Ohio
Original application Aug. 10, 1962, Ser. No. 216,204, now Patent No. 3,483,071, dated Dec. 9, 1969. Divided and this application Oct. 22, 1969, Ser. No. 871,148
Int. Cl. B29c *11/00;* B32b *3/28, 31/06*
U.S. Cl. 156—224                     11 Claims

ABSTRACT OF THE DISCLOSURE

A process for producing a laminated product composed of a plurality of layers of stretchable paper bonded together by interposed layers of a resin which has a saturating consistency with respect to the paper layers either as applied or during curing, a pulverulent filler material being added to the resin in a quantity such that the cured product is characterized by the retention of a discrete layer of resin between adjacent paper layers with limited penetration of the resin into the paper layers.

---

This is a division of copending application Ser. No. 216,204, filed August 10, 1962 and entitled Molded Laminated Articles and Process of Producing Them, now U.S. Pat. No. 3,483,071, dated Dec. 9, 1969.

In a copending application of Larrabee, Calvin and Frick, Ser. No. 857,133, filed December 3, 1959, and entitled Laminate and Articles Produced Therefrom, now abandoned there is described a product made up of universally stretchable webs and alternating layers of thermoplastic resin in a molded or deformed condition. The universally stretchable webs are generally webs of double-diagonally creped papers as hereinafter set forth. The thermoplastic layers are of such character that they are non-extensible at room temperature, but are capable of being heated to a temperature at which they are rendered extensible without becoming so soft or liquid as to attain a strongly saturating consistency. Laminates can be made up of alternate plies of the webs and thermoplastic layers, the laminates being pre-plied under heat sufficient to cause the films to bond to the external fibers of the webs without being wholly absorbed into the webs. The result is a laminate consisting of gathered paper webs in a substantially unsaturated condition interleaved with layers of resin, which layers are non-extensible at room temperature. The product is characterized by extraordinary stiffness in proportion to its density.

Such laminates, under conditions of heat, may be distorted to form a wide variety of hollow articles without losing their essential characteristics. The distorting may be done in closed molds, open molds and single molds. In most cases the laminate extends beyond the mold cavity or mold ring and is subjected to peripheral restraint. By "single molds" is meant such structures as those in which the peripherally restrained laminate is displaced by a plunger-like element engaging it upon one side, with or without fluid pressure on the other side, those in which the laminate is expanded to fill a recess in a hollow member by fluid pressure (inclusive of both vacuum and superatmospheric pressures), and various combinations of these expedients. The term "closed mold" is used to indicate a deforming means having matching female and male mold members engaging opposite sides of the laminate, but having also means for pinching off or cutting off any extending portion of the laminate when the mold parts are fully seated. The term "open mold" is used to designate a deforming means having matching male and female mold members but without the cutting-off feature. In other words, when the mold parts of an open mold are fully seated, there will still be a peripheral space between them, through which peripheral space the laminate extends.

The essential characteristics referred to above contemplate the existence in the formed laminate of discrete masses, webs or films of the thermoplastic substance bonded to but lying between layers of the paper webs. As has been indicated, the deformed laminates exhibit the surprising combination of great strength and rigidity with a low density or specific gravity. It is believed that this result is due to the trussing coaction of the non-extensible films or masses with the paper webs, which webs are themselves extensible but strongly resist internal disruption. The distorted laminates of the copending application are relatively inexpensive, and are also free from brittleness, having some degree of resiliency.

One of the objects of the present invention is the provision of an improved mode of making a structure generally similar to that described above, but one in which the penetration, or lack thereof, of the webs by the resin is controllable.

It is an object of the invention to provide a method and means for retention of enough resin between the surfaces of the adjacent stretchable webs of a laminate to achieve lamination and to prevent delamination even when the characteristics of the resin, and the resin to paper ratio, are such that under molding conditions the necessary quantity of resin would not normally be so retained.

Another object of the invention is the provision of a process of making an article of the class described using thermosetting resins or resins which initially are substantially liquid and tend to be absorbed into the paper webs, or which attain a substantially liquid stage at temperatures desired to cure the resin.

The above stated objects have not hitherto been possible with such resins for the following reasons. If there is insufficient resin to satisfy the absorptive characteristics of the webs, then the resin is likely to be absorbed by the webs to the extent of preventing lamination or permitting delamination because there is insufficient resin retained between the surfaces of the adjacent webs. On the other hand, if there is an excess of the resin over that required to saturate the webs in the final product, then the resin becomes the continuous phase, containing the fibrous webs, as it were, in suspended condition. The strength of the product may increase, but so also will density and cost. Moreover, the product acquires the brittleness characteristic of cured high resin content bodies even when reinforced.

Thus, an important object of the present invention is the provision of a mode of operation in which a resin which is initially liquid or becomes liquid under heat can be caused to remain in large measure between the fibrous plies in a laminated article.

It is an object of the invention to provide a laminate of such character that distortion in any of the operations referred to above is not dependent upon the prior attainment of an elevated temperature to render non-extensible films or layers extensible. In the practice of the process of this invention, the resin does not become set or cured until after the deformation of the laminate.

It is an object of the invention to provide a product having great rigidity and heat resistance coupled with densities lower than those obtained by molding filled resins alone or by molding resinous laminates in which the laminate becomes saturated.

It is an object of the invention to provide a method of rendering one or more plies of a laminate impervious to gas, so that fluid pressure may be used in the molding if desired.

It is an object of the invention to provide improved modes of securing surface ornamentation on laminates and articles made therefrom.

These and other objects of the invention which will be set forth hereinafter or will be apparent to one skilled in the art upon reading these specifications, are accomplished by those procedures and in those products of which certain exemplary embodiments will now be described.

Reference is made to the accompanying drawings wherein.

Figure 1:
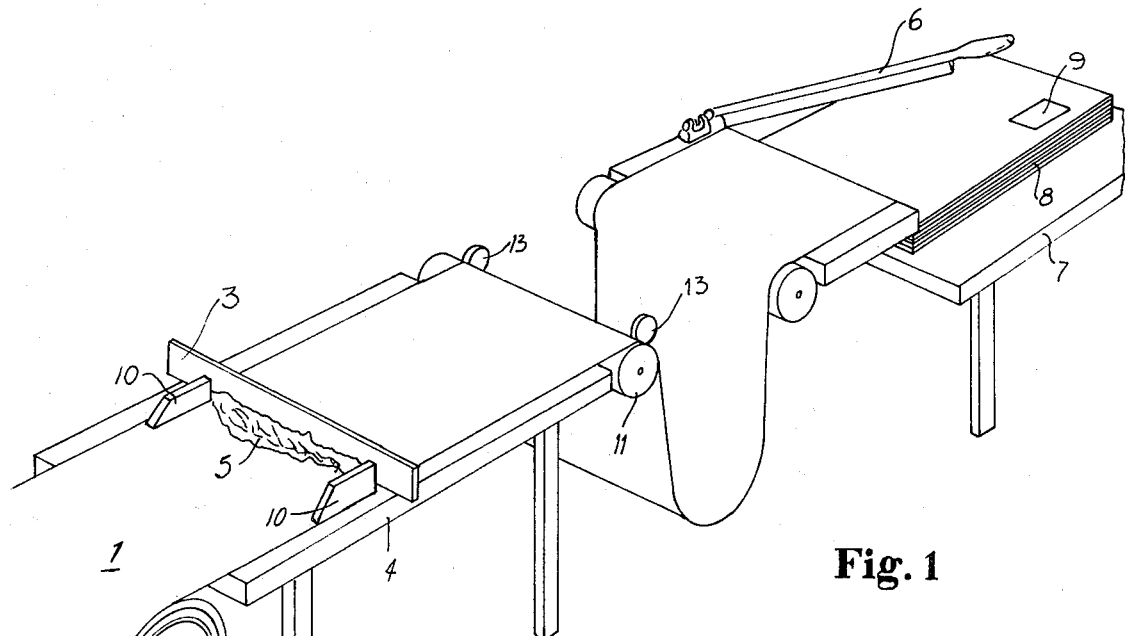
FIG. 1 is a diagrammatic illustration of one form of apparatus upon which initial laminates can be made in the practice of this invention.

The products of this invention are made from resin absorptive webs and resinous thermosetting materials. If the products of this invention are to be formed, the webs must be stretchable. Without limitation, they are preferably webs which have been creped in two substantially opposite directions in accordance with the teachings of one or more of the following patents:

W. C. Kemp No. 2,008,181, issued July 16, 1935
W. C. Kemp No. 2,008,182, issued July 16, 1935
W. C. Kemp No. 2,071,347, issued Feb. 23, 1937
W. W. Rowe No. 2,399,256, issued Apr. 30, 1946
P. W. Dorst No. 2,494,334, issued Jan. 10, 1950
W. W. Rowe No. 2,567,967, issued Sept. 18, 1951
W. W. Rowe No. 2,610,935, issued Sept. 16, 1952.

The best webs for the purpose are webs of paper or cloth. These are fibrous in nature and can be saturated or penetrated to any degree desired or kept substantially unpenetrated through employment of the teachings of this invention. Various basis weights of paper may be employed, and the creped product may be made quite uniform in character, with very small creping crinkles or rugosities despite a large amount of resident stretchability. In accordance with the teachings of the last mentioned patent above, the paper product may be made substantially smooth on one side. In the preferred creping operations a positive creping adhesive is used; but since it is preferably small in amount, it may be disregarded for purposes of the following description.

In the manufacture of laminates and molded articles characterized by great strength and rigidity coupled with low density, the chief problem arising from the use of thermosetting or other resins which are initially penetrating or which attain a liquid character under the temperatures involved in the process is to hold an adequate quantity of such resinous substances in discrete layers between the plies of fibrous stretchable webs. This problem is solved in the present invention by the use of filler substances in the resins, the filler substances being of such character as to remain between the fibrous webs in a resin coated condition.

The pressure used during the molding or forming operation and the means of applying the pressure also are important in determining the depth of penetration of the resin into the fibrous webs. To control this penetration single molds with fluid back pressure, such as air pressure, are preferred. Fluid back pressure provides a uniform pressure on all areas and eliminates problems that would be imposed by the predetermined clearances of matching molds and the differential stretching and thinning of the peripherally restrained laminae.

Various thermosetting resins may be used. As illustrative examples mentioned may be made of the phenol-aldehyde, melamine and urea-aldehyde types of resins, all of which are well known in the art.

However, a resinous substance is preferred which not only is liquid at room temperature in the uncured state, but which is substantially free of volatile substances and does not generate substantial quantities of such substances during curing. The term "100% reactive" is employed by the trade in connection with such resins. Preferred 100% reactive resins include the epoxies and the polyesters.

The use of fillers is not new. Wood flour filler has been mixed with phenolic resin to make molding powders and powdered chalk has been added to polyester resin as an extender. However, in the latter instance the resinous mixture has penetrated through and around the reinforcing materials that have been used, such as mats of glass fibers. The filler substances have been used for the purpose of extending or reinforcing the resin.

The filler material should be a finely divided substance which is economical and which will hold the desired quantity of resin between the surfaces of the laminae. We have used nonabsorptive mineral fillers, such as chalk, absorptive infusorial earth, such as Dicalite, and absorptive vegetable fillers such as wood flour and powdered cork. The preference is for mineral fillers. A filler having a mesh size of about 99% through 300 mesh screen has been found satisfactory; and the particle size of the filler should be such that the resin coated filler material will not substantially penetrate the fibrous web, but will be filtered out be the web and remain largely between the laminae with the filler particles coated with resin.

For purposes of the present invention, a mixture of liquid polyester resin and mineral filler has been found very satisfactory. The quantity of the filler can be varied, but it should lie substantially in the range of ½ to 2 pounds of filler to one pound of the resin with nonabsorptive fillers such as chalk. With absorptive fillers such as infusorial earth the quantity of filler should be substantially in the range of $\frac{1}{10}$ to $\frac{1}{4}$ pound of filler to one pound of the resin.

In the exemplary form of the invention, a mixture is made of liquid polyester resin and chalk in the percentage set forth above; and a heat catalyst is added to the mixture in a quantity of about 1 to 2%. The final mixture is of such consistency that it may easily be knifed onto the surfaces of the stretchable fibrous webs. Any suitable heat catalyst may be employed as known in the resin art. A preferred heat catalyst for use with a liquid polyester resin is benzoyl peroxide.

In one aspect of the practice of the invention, a lay-up or pre-laminate is made prior to the actual molding. For purposes of illustration, the mixture of polyester resin and chalk disclosed in the preceding paragraph will be referred to here, it being understood that this mixture does not constitute a limitation on the invention. Also for illustrative purposes only, the manufacture of a particular kind of molded article, namely, a luggage shell, will be described. A luggage shell is a hollow article adapted to form (with or without additional molded parts), a portion such as a hinged half of a suitcase or like piece of luggage. The article was chosen because it is a structure requiring a substantial distortion of the material in the nature of stretching or drawing, while at the same time it illustrates the advantageous use of corner reinforcements as hereinafter described.

In the exemplary procedure, referring to FIG. 1, the universally stratchable web material 1 may be withdrawn from a roll 2 as required and carried under a knife or doctor 3 while being supported on the opposite side by a table 4 or other structure having a planar surface. The resinous mixture to which reference has been made is delivered by various means well known to the art, as at 5 to the bight between the doctor and the creped paper web; and the movement of the web beneath the doctor will serve to spread a controlled layer of the resinous mixture on the surface of the web. Movement of the web may be accomplished by a drive roll 11 and rider rolls 13. A dry uncoated edge for the rider rolls is provided by dams 10 which confine the resinous mixture to that area of the web which is to be coated. Beyond the doctor there is a knife 6 which is used to cut the coated stock into sheets of the required dimensions. The sheets may be transferred by hand or otherwise to an assembly table 7, where the individual sheets are laid up one upon the other to form a prelaminate 8 of the desired number of plies. It will be apparent that a multiple web coater may be used if desired.

The adhesive nature of the resinous composition causes the plies to cling together. Where reinforcement is desired, as at the rounded and dome-like corners of a luggage shell, reinforcing materials may be interleaved between the plies preferably in the form of reduced dimension pieces as illustrated at 9. The reinforcing materials are web-like materials inclusive of paper, cloth, mats of glass fibers or other fibrous materials, organic or inorganic in character, and the like.

If the reinforcing materials are not such as will be penertated by the resinous mixture, it will be obvious that they should be coated therewith so as to provide, all over the surface of one lamina and its reinforcements, a resinous coating to bind the next succeeding ply. Where tightly woven glass cloth reinforcing materials are used, or other reinforcing materials difficultly penetrable by the resinous mixture, they may be precoated with resinous material.

Many reinforcing materials, however, are of open work construction so that the resinous mixture on the surface of a lamina will strike through them, rendering extra coating operations unnecessary. Thus excellent results have been obtained by using reinforcements 9 of open mesh glass cloth. The resinous mixture on the underlying ply of the laminate 8 strikes through the meshes of the cloth and makes immediate adhesive union with an overlying ply. There may be enough distortability in a relatively small piece of reinforcing web material to permit it to conform to the general shape of the ultimate article even though it is not gathered for stretchability.

Another way in which reinforcement can be accomplished is by the location at selected positions of an extra thickness of resin or resinous mixture, applied in any suitable way.

In making up a laminate, reinforcement means may be incorporated between any two adjacent plies or between all adjacent plies, as well as externally, as may be required by the usage to which the article will be put. External reinforcements can be applied after forming.

By way of illustration but without purpose of limitation, a pre-laminate or lay-up for the specific purpose set forth may be made up of 165 pound basis weight of double-diagonally creped paper having lateral and longitudinal stretchabilities sufficient for the draw which is to be made in the laminate, the paper laminate being coated with about 200 pound basis weight of the resinous mixture. The "basis weight" referred to herein is the weight per 3000 square feet, equivalent to 500 sheets, 24 by 36 inches. The number of laminae may be determined by the dimensions of the final article and the required strength and stiffness therein. The top lamina may be a web of uncoated paper. The lay-up of pre-laminate is then transferred to a press, equipped with a single mold and fluid back pressure, and with the aid of a rubber blanket as a barrier, is formed into the desired shape and cured as hereinafter described.

Matching molds may be used but they are much more expensive than single molds. When forming a peripherally restrained lay-up differential stretching and thinning takes place. Thus the predetermination of the clearance between the two members of matching molds, in order to obtain uniform pressure over the entire formed product, is extremely difficult. Also, additional molds are required for different thicknesses of formed products. Single molds with fluid back pressure overcome these objections because uniform pressure is assured and one mold can produce a given formed product in any thickness desired.

Figure 2:
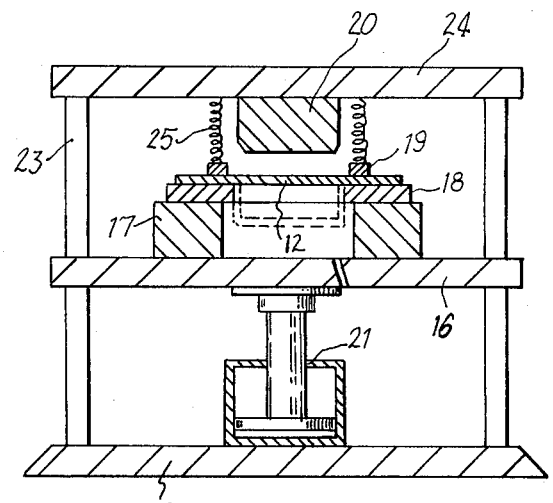
FIG. 2 is a diagrammatic illustration of one form of single mold of the so-called ring and plug type, with further diagrammatic illustration of certain parts of a press in which the mold is used.

Since the preferred molding or distorting operations practiced in connection with this invention are primarily stretching operations, and for reasons stated above, various forms of single molds are preferred. Referring to FIG. 2, a molding apparatus is shown comprising a press having a platen 16. On this platen there is shown a hollow member or chase 17 which is not a molding member but is a support. The edges of the pre-laminate or lay-up 12 are supported by a molding ring 18 superposed on the chase 17. Edge portions of the pre-laminate are clamped against the top surface of the hollow member in any suitable way, but preferably by a holding ring 19.

The distortion is accomplished by a single mold member 20 passing through the ring 19 and the molding ring 18, and distorting the pre-laminate as shown in dotted lines. Relative movement of the plunger and the hollow member and the molding ring is effected by means of the press, which is powered hydraulically, mechanically or by air. An hydraulic cylinder and piston indicated generally at 21, may be mounted between the base 22 of the press and the platen 16. The platen may be slidable on the usual press frame rods 23 which connect the base with the top element 24. The single mold member or plunger 20 is mounted on the top element 24, and will have electrical or fluid connections (not shown) for the application of heat. The holding ring 19 may be spring pressed as at 25 from the top element. Such stop means for limiting the relative motion of the platen and plunger as well as for lifting the holding ring may be provided as desired. Since such elements are well known to the worker in the art they have not been illustrated in the diagrammatic showing of FIG. 2. Fluid back pressure may be utilized by sealing the chase 17 against leakage and introducing air, or other suitable fluid, through ports in the chase. A rubber blanket or other stretchable material, as hereinafter described, may be utilized as a barrier for the fluid pressure. It will be understood by one skilled in the art that the position of the molding elements may be inverted in FIG. 2 so that the male member 20 will be positioned below the pre-laminate.

Figure 3:
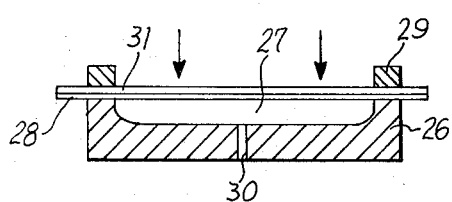
FIG. 3 is a diagrammatic illustration of another form of single mold.

Yet another form of single mold structure is illustrated in FIG. 3. Here the mold member 26 has a molding cavity 27 for determining the desired final shape of the article. The pre-laminate or lay-up 28 is placed over or against the mold element 26 and the edges of it which project beyond the cavity 27 are clamped in position by a holding ring 29 or other suitable means. Instead of employing a plunger to distort the material, the pre-laminate may be deformed and caused to conform to the surfaces of the cavity by fluid pressure. One may apply fluid presure such as air pressure against the side of the pre-laminate opposite the cavity, or one may add a vacuum between the cavity and the prelaminate by withdrawing air through ports in the member 26, one of which is indicated at 30,.

Where the pre-laminate is not itself impervious to fluid-pressure, resort may be had to the use of an imprevious blanket 31 of rubber or other stretchable material.

Fluid pressure is a requirement of the process as shown in FIG. 3 because there is no male member to form the material. Consequently sufficient fluid pressure, such as air, must be applied to fully form the resinous coated fibrous plies into the cavity. The amount of pressure necessary will depend upon the shape that is to be formed plus the resistance to stretch forming of the plies and the number of plies. As an example, but without purpose of limitation, with a 60:40 chalk to resin ratio and a 40:100 ratio of resin to paper, pressures from 100 to 200 p.s.i. have been used successfully while still retaining cross sectional areas of the fibrous webs free of resinous penetration. Greater pressures may result in complete penetration but enough filled resin will remain between the laminae to accomplish proper bonding of the laminae even when the resin to paper ratio is low.

On the other hand, much lower back pressure may be successfully used in the process as shown in FIG. 2. Commercial products have been made by using a rubber blanket or a sheet of thermoplastic film (not shown) on the side of the lay-up opposite to the male plunger. The very low pressure exerted by the stretch forming and resultant tensioning of such a blanket or film is sufficient to provide and retain the contact that is necessary for lamination. Such a rubber blanket or thermoplastic film will also provide the barrier that is necessary if fluid pressure is to be used.

It has been found, however, that physical properties such as deflection, corner compression and impact fatigue, are improved with the use of increased back pressure. Normally air back pressure in the range from 20 to 50 p.s.i. is employed.

The mere distortion of the preferred pre-laminate above described does not require the use of heat as has already been indicated. This permits the distortion to start upon the proper location and clamping of the pre-laminate or lay-up in the molding apparatus. It will be understood that heat is required for the curing of the resin. Consequently, heat will be applied to the single mold elements of FIGS. 2 and 3. This may be done by electrical or fluid heating means (not shown) in ways well understood by the worker in the art. The molded or distorted article will be left in the mold until sufficient cure of the resin has been accomplished to enable the article to retain its final shape. The fluid element may also be heated.

It will be understood, that if the male element 20 of FIG. 2 is provided with a recess in its molding surface, sufficient back pressure may be applied to cause the pre-laminate to enter this recess. In this way the molding procedures described in connection with FIGS. 2 and 3 have been combined.

In the prior art luggage shells and some other articles have been covered on the outer surface with materials of a decorative nature, formed and affixed to the shell after manufacture is otherwise completed. It is an advantage of the process of this invention, however, that decoration may be accomplished as a part of the process, making a second and separate operation unnecessary. The outer paper web of the lay-up may be given a surface finish prior to making the lay-up. The term "surface finish" as here used is inclusive of physical textures such as may result from creping or embossing, and of coloration or patterns, such as may be formed by printing or equivalent procedures, and of the provision of overlying films, clear or colored, opaque or transparent, imposed upon the product for the sake of appearance, and/or protection, and forming part of the laminate. Any thermoplastic film which is capable of stretching to accommodate the draw, may be used, such as polyvinyl chloride. With limited depths of draw, printed or colored cloth may also be used.

It is an advantage of the invention that webs having pre-formed surface configurations may be employed for surface decoration, such webs being attached to the laminate before or during the distortion or molding of the laminate to form the final article. The double-diagonally creped paper webs which are preferably used in the practice of this invention lend themselves very well to the production of surface textures by embossing. For example, by means of a suitable platen press and dies, or by means of suitably configured rolls, the universally stretchable paper webs may readily be given textures simulating cloth and different forms of leathers, as well as other configurations of a decorative or arbitrary character. The surface texture of a gathered web showing small and evenly distributed creping crinkles is pleasing in itself and blends very well with printed designs such as representations of woven cloth and the like.

The webs, prior or subsequent to embossing, may be colored or printed. It has been found, that if a colored or printed web, which may also be a textured web, can be covered with a transparent film of thermoplastic substance, the appearance of the product is not only greatly enhanced, but the film acts as a barrier to liquids and gases, as well as contributing to the wear resistance of the product. It is also possible to use a colored film, opaque or transparent, over an uncolored, textured web. The problem is to cause such a film to adhere and conform to the underlying textured surface without destroying or impairing the surface texture of the web. In the prior art, films have been adhered to underlying webs by the use of heat and/or adhesives plus positive pressure applied by the use of rolls or press platens. The use of any of these procedures tends to destroy any texture previously imparted to the underlying web. Further, if a film were adhered to an underlying textured web during a forming and laminating process while using matching molds, the texture previously applied would tend to be destroyed due to the predetermined clearance between the mold members. This problem may be overcome and a thermoplastic film adhered to the surface of a textured web which forms the top lamina of a lay-up by utilizing a combination of temperature, time and fluid pressure, as follows. It has been found that, during the process of making a formed laminated article using single molds and fluid back pressure, the combination of a temperature suitable to soften the plastic, with the time element necessary for curing the resinous mixture, and the application of fluid back pressure will cause an overlying thermoplastic film to adhere and conform to the surface texture of the web underneath it while preserving the surface appearance and texture of the underlying web.

Such an overlying film should be impervious to gases or liquids in order to provide the barrier necessary for the use of fluid back pressure. Examples of thermoplastic films that may be used are polyvinyl chloride, polyvinylidene chloride, polyethylene, polypropylene, videne, Mylar backed with polyethylene and acrylonitrile-butadiene-styrene.

In this procedure, heat may be employed sufficient to render the thermoplastic film tacky so that it will adhere to the surface of the paper layer; but it is also possible to assist adhesion by precoating the top paper lamina with a heat-sensitive adhesive compatible with the overlying thermoplastic film. For example, when the overlying film is vinyl the top paper lamina my be precoated with a dispersion of polyvinyl chloride (such as those sold under the trademark Geon).

The same combination of temperature, time and fluid pressure makes it possible to join to the top lamina of a lay-up an unsupported film of thermoplastic resin such as vinyl which has been pretreated by embossing or otherwise to give it a textured surface. In the handling of textured films in accordance with this procedure, it is generally advisable to employ an adhesive as described above; although depending upon the nature and thickness of the thermoplastic film an adhesive may sometimes be dispensed with. It is also possible to use a supported film which has been adhered to a universally stretchable web and textured, and to adhere this laminate to the lay-up by means of the thermosetting resinous mixture.

When using a pre-textured film, whether it is unsupported or supported by a backing, it is preferable to have the texture predominantly one sided, that is, having one relatively smooth side and one textured side so that the caliper is appreciably greater at the peaks of the texture than it is in the valleys. This type of texure is more resistant to loss of appearance under the stretching and elevated temperatures involved in the forming and curing operation.

In the manufacture of the laminated products to which this invention is primarily addressed, the use of a filler substance in the thermosetting resin employed for laminating purposes holds the resin in a position between the plies of gathered webs. This is to say, the resin coated filler material as a layer cannot enter into plies, and it holds in a position between the webs that amount of the thermosetting resin which is required to achieve proper bond between the fibrous layers in the laminate, irrespective of the fact that during the molding operation at least the thermosetting resin itself attains a thinly liquid saturating characteristic.

Heretofore, when using resins which are initially of a consistency that tends to saturate fibrous webs or which reach such a consistency under the temperatures and pressures desired during the curing operation, it has been difficult to achieve good lamination when low resin to paper ratios and low pressures are employed. This has been so because the relatively small amount of resin penetrates and absorbs into the fibrous webs leaving an insufficient amount on the surface of, or between the laminae. Therefore, relatively high resin contents and relatively high pressures have been used to insure good adhesion. Thus the products of the prior art are dense and costly. They are also relatively brittle. One versed in the art is aware that a low resin content, within the reinforcing laminae, is desirable for increased impact strength.

By the procedures above described, it has been possible to achieve positive adhesion between the plies with low resin content, while using low pressures. The reinforcing webs can be kept substantially unsaturated and unpenetrated. As an example, but without purposes of limitation, products are being commercially produced using five plies of universally stretchable paper, combined basis weight of 825 pounds, coated with four layers of resinous mix, combined basis weight of 800 pounds and consisting of a chalk to resin ratio of 60:40, thus having a paper to resin ratio of 100:38.8. These products are formed, laminated and cured by the process as shown in FIG. 2 and hereinabove described using air back pressure of 20 to 30 p.s.i. The importance of uniform pressure and the preference for single molds has already been indicated. By using these procedures a quantity of resin is held between the paper plies and upon hardening through cure forms a non-extensible rigid layer between each pair of paper plies.

The products just described have a relatively low density with surprising rigidity and strength and are not brittle. Cross sectional areas of the paper laminae remain substantially unpenetrated by the resin. If a non-brittle product, slightly higher in density but possessing greater strength is desired, it is possible to achieve a regulated pentration of the resin into the paper plies by increasing the back pressure. Referring to the previous example, an increase of back pressure to the range of 200 to 300 p.s.i. would result in penetration of the resin throughout the paper laminate in a controlled and low amount while still retaining the layer of resinous mixture between the plies.

It is also possible to provide for the penetration of a controlled amount of resin into the laminae by a reduction of the amount of filler in the resinous mix while retaining the same amount of resin. In the previous example, if the filler content was reduced from 60% to 33% of the resinous mix and the resin to paper ratio remained the same, penetration of the resin into the paper in a controlled and low amount would occur at back pressures in the range of 100 to 200 p.s.i., while retaining a layer of the resinous mixture between the plies.

Through the teachings of this invention it is possible to make products possessing good lamination and surprising strength and rigidity with paper to resin ratios as low as 100 to 25 and with back pressures lower than 10 p.s.i.

Comparative tests made on products of this invention (containing a filler such as chalk in the resin) as against products made from the same materials but without the chalk, exhibit superior physical qualities including corner compression values and impact fatigue values.

The strength characteristics of the products of this invention may be increased by increasing the thickness of the layers of filled resin located between the paper plies, while retaining low density as compared with saturated products.

In commercial practice the coatings of filled resin of the chalk polyester type hereinabove described, have generally ranged from 125 pounds to 350 pounds per 3000 square feet, using filler to resin ratios of 66:33 to 33:66 and paper to resin ratios as low as 100:25. However, this is not a limitation since coats and ratios outside of these ranges have been used successfully.

EXAMPLE I

A mixture was made of liquid polyester resin and a filler of limestone or chalk in weight proportions of 1:1. This mixture contained a catalyst and was capable of being rapidly hardened to an infusible condition under heat. Universally stretchable creped kraft paper having a basis weight of 165 pounds was coated with the mixture of polyester and filler, the application being of 175 pounds per 3000 square feet. The coated paper was cut into sheets of a desired size and these sheets were laid up one on top of the other, on a table to form a pre-laminate comprising at least five layers of coated web. Reinforcements were used at selected positions as hereinabove described. A final top sheet was placed on the coated surface of the top laminae. This sheet was a sheet of universally stretchable paper of the same basis weight, coated with a layer of polyvinyl chloride and embossed to provide a desired texture.

The pre-laminate, or lay-up, which adhered together by reason of the tacky condition of the resinous mixture, was transferred to a press equipped with a single mold of the plug and ring type, as shown in FIG. 2. The plug was heated to a temperature sufficient to cure the resin, and the lay-up was formed under a pressure sufficient to deform it to the desired shape. The deformation can best be described as an operation analogous to the drawing of metal.

The exposed layer of the laminate was then subjected to a positive fluid back-up pressure of air at about 30 p.s.i.

The result of the operation, after the resin was cured in the press and the excess peripheral portion of the laminate was trimmed away, was a luggage shell having a depth of something more than two inches. The shell was strong and had a high degree of stiffness, although its specific gravity was only 1.1 to 1.2. The textured surface was retained.

It will be understood that the power or mechanical pressure required to deform the pre-laminate or lay-up, will be subject to variation due to the number and thickness of the plies in the structure. The back-up pressure will be sufficient to insure that all layers are pressed and cured in contact with each other.

EXAMPLE II

A similar laminate was made up excepting that its top layer was a layer of multilaterally stretchable creped kraft paper in uncoated condition and not textured. This was molded as above described; but since the surface layer was not impervious to gas, the back pressure was exerted on it through the intermediary of a rubber blanket or membrane. The molded article had substantially the same physical characteristics.

EXAMPLE III

A laminate similar to that of Examples II was laid across the cavity of a female mold member in a press, and clamped about the edges of the mold cavity. The central portion of the laminate was drawn into and caused to conform to the cavity of the female mold member by fluid pressure exerted on the side of the laminate opposite the cavity through the intermediary of a rubber blanket. The mold member was heated to cure the thermosetting resin.

The result was a luggage shell having substantially the same characteristics as those described above.

EXAMPLE IV

Pre-laminates or lay-ups were made and pressed as set forth in Example II, but including a pre-embossed film of vinyl chloride laid over but not adhered to the outermost ply. The outermost paper ply, next to the vinyl film, was coated with Geon. The result was a luggage shell having substantially the same physical characteristics as those described above and possessing a textured vinyl surface. It was not necessary to use a rubber blanket because the vinyl film was impervious to the passage of fluid, such as air.

EXAMPLE V

A lay-up was made as in Example IV, excepting that an outer ply of the paper bore a decorative printing and the texture imparted by creping. This outer ply was covered with a thermoplastic film of polyvinyl chloride which was clear and unembossed. Upon molding as in Example I, a product was produced which was similar in physical characteristics. It had, however, a wear resistant outer coating of polyvinyl chloride to which had been imparted the surface texture of the underlying paper layer. The print design of the underlying web was apparent and decorative.

It was found that a similar effect could be obtained using an adhesive, e.g., when the top paper layer had been coated with a thin coating of Geon and dried.

Modifications may be made in the invention without departing from the spirit thereof. For example, it will be obvious to one skilled in the art, that the laminates hereinabove described may be made in the form of flat panels. This is done by incorporating a layer of resin coated filler material between the plies, in accordance with the teachings of the present invention. Surface decoration may also be accomplished in accordance with these teachings.

The invention having been described in certain exemplary embodiments, what is claimed as new and desired to be secured by Letters Patent is:

1. A process for producing a laminated product composed of a plurality of layers of universally stretchable paper bonded together by interposed layers of a thermosetting resin which has a saturating consistency with respect to the paper layers either as applied or during curing, which comprises the steps of:
   producing a mixture of said resin and a pulverulent filler material the particles of which are coated with the resin and are of a size such that they will not substantially penetrate the paper layers when the resin is cured;
   forming a lay-up composed of a plurality of paper layers joined together by interposed discrete layers of said resin and filler mixture;
   deforming the lay-up so formed under sufficient heat and pressure to cure said resin and bond said paper layers together;
   the particles of filler material being present in a quantity such that the cured product is characterized by the retention of a discrete layer of resin between adjacent paper layers with limited penetration of the resin into the paper layers.

2. The process of claim 1 wherein the said paper layers will filter out enough resin coated filler particles to provide a laminating layer of resinous material even when an excess of resin is permitted to penetrate the paper.

3. The process of claim 1 wherein said lay-up is deformed in a single mold structure.

4. The process of claim 3 wherein fluid back pressure is used to deform said lay-up.

5. The process claimed in claim 1 wherein said resin is chosen from the class consisting of 100% reactive resins comprising polyester resins and epoxy reins, wherein said resin is substantially liquid at room temperature in the uncured condition, and wherein said mixture of resin and filler contains also a heat catalyst.

6. The process claimed in claim 1 wherein the basis weight of the paper layers is substantially in the range of 100 to 250 pounds per 3000 square feet.

7. The process claimed in claim 1 in which the said mixture is applied to the surface of said paper layer in an amount of substantially 124 to 350 pounds per 3000 square feet.

8. The process claimed in claim 1 wherein the ratio of filler to resin in said mixture is substantially 33%:66% to 66%:33%.

9. The process claimed in claim 1 wherein an outer ply of thermoplastic film is superposed over a textured web and adheres to the laminated product and conforms to the texture of the said web.

10. The process claimed in claim 1 wherein an outer ply of textured thermoplastic film is superposed over an external web and adheres to the laminated product and retains its texture.

11. The process claimed in claim 1 wherein a textured outer ply, consisting of a layer of thermoplastic resin combined to a supporting web, is superposed over an external web and adheres to the laminated product and retains its texture.

References Cited

UNITED STATES PATENTS

| | | | |
|---|---|---|---|
| 1,265,132 | 5/1918 | Stokes | 161—129 |
| 2,304,123 | 12/1942 | Rowe | 161—120 |
| 2,861,910 | 11/1958 | Johnston et al. | 161—195 |
| 2,987,103 | 6/1961 | Yakubik | 161—254 |
| 3,121,656 | 2/1964 | Gluck | 161—158 |

FOREIGN PATENTS

| | | |
|---|---|---|
| 577,676 | 5/1946 | Great Britain. |

WILLIAM J. VAN BALEN, Primary Examiner

U.S. Cl. X.R.

156—245, 282, 287; 161—162